United States Patent [19]

Bielak

[11] 4,150,959
[45] Apr. 24, 1979

[54] ELEMENTS FOR DUST COLLECTOR

[76] Inventor: Frank A. Bielak, 1742 Wagar Rd., Rocky River, Ohio 44116

[21] Appl. No.: 723,807

[22] Filed: Sep. 16, 1976

[51] Int. Cl.² .......................................... B01D 46/02
[52] U.S. Cl. ............................. 55/341 HM; 55/379; 55/502; 210/486
[58] Field of Search .................... 55/341 HM, 379, 97, 55/302, 294, 502; 210/486

[56] References Cited

U.S. PATENT DOCUMENTS

| 2,906,371 | 9/1959 | Jones ........................................ 55/294 |
| 3,295,687 | 1/1967 | Schmerler ................................ 55/379 |
| 3,315,446 | 4/1967 | King, Jr. .................................. 55/294 |
| 3,865,561 | 2/1975 | Osborn .................................... 55/97 |

FOREIGN PATENT DOCUMENTS 1000457  8/1965  United Kingdom ..................... 55/379

*Primary Examiner*—Bernard Nozick
*Attorney, Agent, or Firm*—Woodling, Krost, Granger & Rust

[57] ABSTRACT

The present disclosure relates to improvements in dust collection apparatus, which apparatus has a dividing wall, which serves to define a high pressure side and a low pressure side. The wall comprises a plurality of filter bags which bags are mounted in a generally vertical plane and with each bag having an open end defined by two flaps. The flaps on adjacent bags are mounted on vertically extending support members commonly referred to as mullions and other means are provided for supporting the closed ends of the bags. The disclosed improvements herein include a new spacer member for insertion into the bags from the open end thereof to keep the bags from collapsing during operation of the dust collection apparatus. An additional improvement is that of a protective shield which has a generally U-shaped cross section which is adapted to fit over and around flaps on adjacent filter bags which flaps are supported by a given mullion between adjacent bags. Another part of the disclosure has to do with the construction of an air seal strip which is for the purpose of preventing air flow through a given opening in a given filter bag. This construction is for the purpose of permitting overall operation of the dust collection apparatus while preventing flow through a given filter bag which may have been damaged, thus permitting the passage of dust therethrough.

6 Claims, 13 Drawing Figures

IMPROVED ELEMENTS FOR DUST COLLECTOR

The present invention relates in general to dust collection apparatus and more particularly to systems wherein dust laden air from an industrial operation is admitted into a collector which usually comprises a housing defining an enclosure and in the housing the dust laden air is brought to a dust wall which dust wall is pervious to the passage of air and impervious to the passage of dust. The type of dust wall with which the present invention is connected is a dust wall made up of a plurality of generally vertically mounted, spaced and parallel filter bags. The filter bags are generally elongated and flat in appearance with a closed end and generally parallel sides and an open end. The open end is adapted to normally face the low pressure or outlet side of the housing or collector. With this particular construction in mind it will be appreciated that the dust laden air is introduced into the collector at the inlet or high pressure side of the dust wall and the dust is collected on the outside of the filter bag and the air, substantially free of dust, passes into the inside of the bag and thence out through the open end of the bag to the low pressure side of the collector.

It will be appreciated by those skilled in the art that it is necessary to provide for the insertion of mechanical means inside each of the filter bags so as to prevent the collapse of the bag while the air is forced through the walls of the bag from the high pressure to the low pressure side thereof so as to present as large an area as possible for the deposition of dust on the outside surface of the bag. The present invention discloses a plastic grid spacer to prevent the bag from so closing while air is forced through the bag and the present spacer construction has many advantages in that because of its construction it can be used substantially indefinitely with many bag changes. The material of construction and the structure of the grid spacer itself provides a smooth surface and low heat conductivity which reduces wear on the cloth bags which are used in the dust collection apparatus. The present grid spacer distinguishes itself from the presently used prior art devices which are normally of a wire construction with some of the prior art devices being coated with rubber. The prior art devices normally distort in handling and a large percentage must be scrapped when the filter bags are replaced. The high heat conductivity of the wire or rubber coated wire produces excessive wear on the cloth bags at contact areas. The grid spacer of the present invention is preferably constructed of a material which comprises approximately 80% nylon with 20% glass fibers and this material of construction is conducive to an advantageous construction which reduces wear on the filter bags as well as providing a construction which has an inherent resiliency which returns the grid spacer to its normal shape, even after distortion. Many other plastic materials may be used depending on the operating conditions and an example of another material is polypropylene. The grid spacer of the present invention is preferably made of two mirror image parts which are easily connected to each other for convenient and quick insertion into the filter bags.

It is, also, common in the dust collection apparatus to which the present invention relates, to provide a reverse air flow traveler mechanism for selectively blowing dust from given bags in the dust collection apparatus. In such a mechanism there is normally provided a plurality of wiper elements which are brought into engagement with the end flaps of the filter bags where the filter bags are connected or mounted on vertically extending mullions. The contact of these wiper blades has a tendency to cause wear and early malfunction of the filter bags because of wear on the flaps. This has normally been combated in prior art devices by the provision of an armor plate flange which is integrally attached to one of the flaps of the filter bag. The disadvantage of this prior art construction is that it makes the filter bags quite expensive to the ultimate consumer because of the armor plate flange and the disadvantage of the armor plate flange is that it only protects the filter bag from the wiper blades as the traveler mechanism moves in one direction. The provisions of the present invention involves itself with a protective shield which is generally U-shaped in cross sectional configuration and which is separate from the filter bag and can be removed therefrom when a filter bag wears out and is available for use with the next filter bag when it is installed. The protective shield protects the cloth bag from the wiper blades on both sides of the mullion and it retains its position and its protective feature regardless of which direction the wiper blades move. The protective shield can be used indefinitely with many bag changes resulting in a much lower cost to the ultimate consumer for each filter bag used.

An additional feature of the present disclosure and invention is an air seal strip. In present dust collection apparatus which involves the use of a multiplicity of filter bags mounted as mentioned hereinabove, one will appreciate that when a given filter bag becomes damaged or worn it will arrive at a a point where it no longer is effectively performing its function of collecting dust while permitting clean air to pass therethrough. In prior art constructions, when one of the bags becomes damaged, it is necessary to shut down the entire dust collection apparatus and replace the given damaged filter bag. The average life of a filter bag may be on the order of one to three years, but bag failures do occur much earlier in a small percentage of cases. When this happens, the entire dust collection apparatus must be shut down in order to repair the given damaged filter bag to prevent pollution of the atmosphere and prevent wear on the cleaning mechanism. The time necessary to repair a given bag in a shut down of the entire facility is on the order of at least one hour and then it requires two men to make the repair by replacing the faulty bag. The air seal strip of the present invention enables one man to seal off the air flow through the faulty bag or bags in about five to ten minutes and the important feature is that the dust collection apparatus does not have to be shut down for the total time necessary to completely replace the damaged bag or bags. It should be kept in mind that the equipment must be shut down for the short five or ten minute interval necessary to seal off the faulty bag. The advantage of this feature of the invention is that the entire dust collection apparatus need not be shut down for a long period of time and the replacement of damaged bags can be postponed to a more convenient time.

Other objects and a fuller understanding of this invention may be had by referring to the following description and claims, taken in conjunction with the accompanying drawings, in which:

Figure 1:
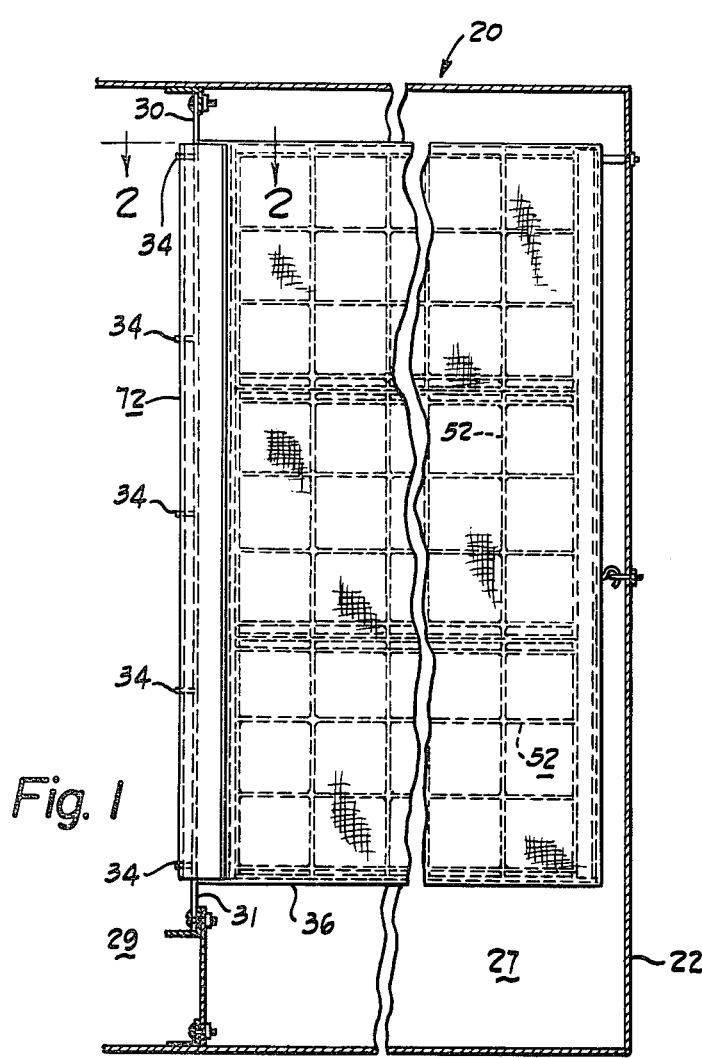
FIG. 1 is an elevational view of a dust collection apparatus embodying the present invention.
Figure 2:
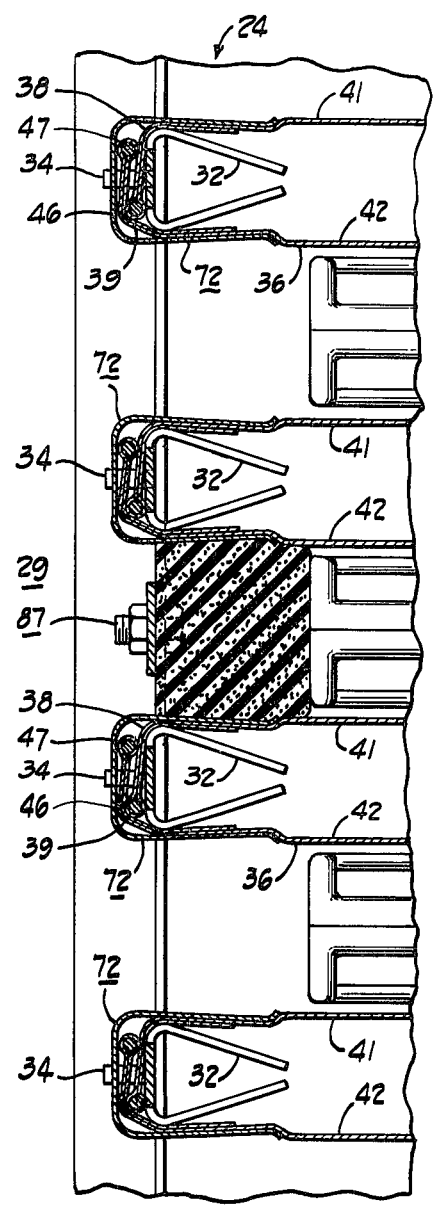
FIG. 2 is an enlarged fragmentary view taken generally along the line of 2—2 of FIG. 1.
Figure 3:
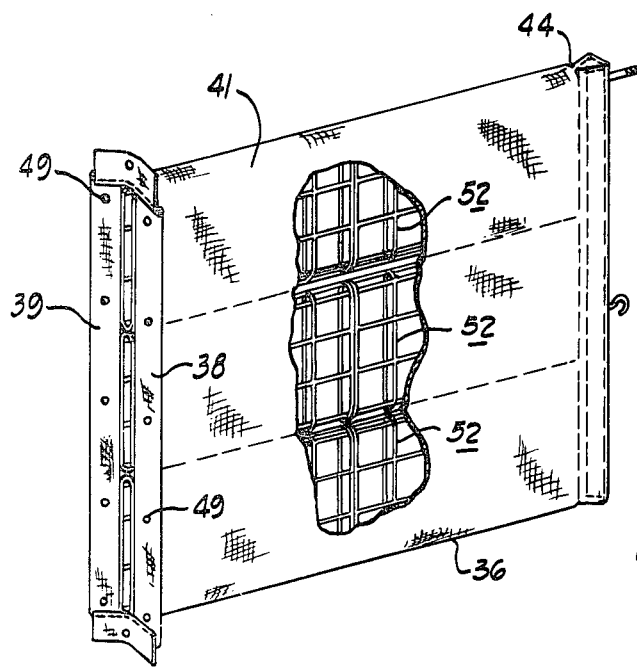
FIG. 3 is an isometric view of a filter bag as shown in FIG. 1 and utilizable in the present invention.

FIGS. 1 and 2 show a dust collection apparatus within which are incorporated the teachings of the present invention and this apparatus has been indicated generally by the reference numeral 20 and includes a housing or enclosure 22 within which are mounted a plurality of filter bags 36. The mounting of the filter bags serves to provide a dividing or dust wall 24 which serves to define a high pressure side or upstream side 27 and a low pressure or downstream side 29. The wall includes a plurality of spaced and vertically extending channel shaped mullions or support members 32 with the mullions being fixedly secured at their upper end portions to a support 30 secured to an upper wall of the housing 22 and at their lower ends the mullions are fixedly secured to a similar support 31 secured to a bottom wall of the housing 22. For the purposes of mounting and securing the filter bags each of the vertically extending mullions is provided with a plurality of vertically spaced pins 34 which serve to mount the bags. FIG. 3 is an isometric view of the general construction of the filter bags 36 and it will be seen that each filter bag has a generally elongated flat shape or appearance which comprises side walls 41 and 42, a closed bottom 44 and first and second flaps 38 and 39 which serve to define an opening into each filter bag. Additionally, the flaps 38 and 39 are provided with reinforcing wires 46 and 47 and each of the flaps is, also, provided with spaced openings 49. As is best observed in FIG. 2 the openings 49 in the first flap 38 of a given filter bag fit over corresponding vertically spaced pins 34 of a given mullion and the openings 49 in the second flap 39 of the same filter bag fit over the vertically spaced pins of a mullion 32 adjacent the given mullion to hold the filter bag opening in open position as shown.

It will be appreciated by those skilled in the art that dust laden air is introduced into the housing 22 on the high pressure side 27 and because of a pressure differential the air flows through all sides of the given filter bags where the dust is deposited upon the walls of the filter bag and the clean air passes into the bags and out the openings thereof to the low pressure side 29 and then out of the housing 22.

FIGS. 4 through 8 show the improvement and structure of the grid spacer of the present invention, which is utilized by positioning the same in the filter bags to prevent the bags from collapsing during functioning of the dust collection apparatus. It will be seen from FIG. 1 that a plurality of the devices that are shown in FIGS. 4 through 7 are utilized to support a given filter bag in its open and fully expanded position. It will be appreciated by those skilled in the art that one large grid spacer might be used to support the bag in such open position and this may be varied within the skill of the art.

The spacer 52 comprises first and second identical parts 54 and 56, respectively, and the preferred construction of the two identical parts is of a plastic or synthetic resin material which is capable of withstanding the temperature of the environment within which the grid spacer is adapted to operate. This environment is normally within a temperature range of 212° F. to 370° F. and suitable materials can be selected for this particular temperature range. For most purposes it has been desirable to utilize a construction which comprises 80% nylon and 20% glass fibers. Each identical part includes a first plurality 58 of generally parallel and longitudinally extending spaced grid members and a second plurality 60 of generally parallel and longitudinally extending spaced grid members extending transverse to the first plurality. The first and second plurality of grid members 58 and 60 are integrally connected together at their crossing points as indicated by the reference numerals 62 to form a plurality of support junctures.

Male connection posts 64 are formed at some of the support junctures and female connection sockets 66 are formed at other of the support junctures. The first and second identical parts are connected together by the male connection posts on one part fitting into the female connection sockets on the opposite part as particularly illustrated in FIGS. 5, 6 and 7. Opposed end portions 68 of the second plurality 60 of grid members is formed in a curved configuration as seen with the extreme ends of each opposed end portion integrally connected to one of the first plurality 58 of grid members sometimes referred to as an auxiliary grid member. This forms a construction whereby when the first and second identical parts are connected together, a rounded configuration is formed at the end portions of the second plurality of grid members to assist in inserting the grid spacer into a given filter bag. When the two identical parts are connected together they form what may be referred to as a chamber particularly when they are covered by a filter bag. With this construction most of the interior of the chamber is open for unobstructed air flow with the exception of the male posts and female sockets.

The grid spacer construction of the present invention as just hereinabove disclosed is extremely advantageous because when constructed of a synthetic resinous material, the grid spacer has a low heat conductivity which results in less damage to the filter bags, which contributes to their longer life. The material of construction, also, provides less abrasion to the filter bag resulting in longer life to the bag and the synthetic resinous material has a substantial memory so that even if distorted, it returns to its molded or formed shape. It will, also, be appreciated that the grid spacer has substantial strength in that in the specific device shown in FIGS. 4 through 7 there are twenty-four separate locking and support points to provide more strength to the spacer. It will be apparent to those skilled in the art that the spacer may be made smaller or larger which would result in correspondingly fewer or greater numbers of locking and support points. As a result of this, the presently disclosed grid spacer is extremely advantageous in preventing the bag from closing while dust laden air is forced through the bag. The smooth surface low conduction of heat by the grid spacer reduces substantially the wear on the cloth filter bags.

Figure 8A:
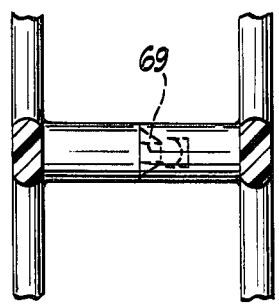
FIGS. 8a and 8b are views showing alternative means of connecting the two identical parts of the grid spacer together.
Figure 8B:
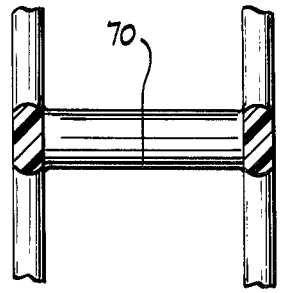

FIGS. 8 illustrates two alternative means of connection between the two identical parts 54 and 56. FIG. 8a illustrates a ball and socket construction 69 and FIG. 8b shows a leg construction 70, which can be permanently secured together by means of an adhesive.

Figure 9:
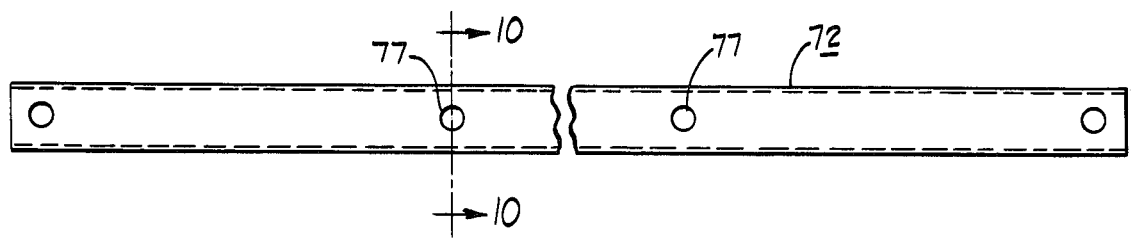
FIG. 9 is a view of the protective shield of the present invention.
Figure 10:
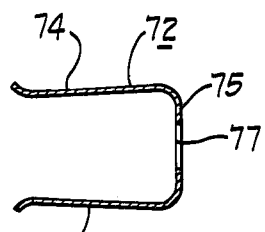
FIG. 10 is an enlarged view taken generally along the line 10—10 of FIG. 9.

FIGS. 9 and 10 illustrate the improvement of a removable protective shield 72 which is adapted to fit over and protect the first and second flaps 38 and 39 of adjacent filter bags which are located or supported on a given mullion 32. The protective shield 72 is preferably constructed of a metal material and comprises first and second side walls 73 and 74 and a bottom wall 75 which define a generally U-shaped cross section. The length of the protective shield is shown in FIGS. 1 and 9 and it is on the order of the length of the mullions. Wall means serve to define spaced openings 77 in the bottom wall 75 and these openings fit over the pins 34 in a given mullion. With the U-shaped protective shield in place in the environment as illustrated in FIGS. 1 and 2, the flaps of the filter bags are completely protected on both sides against undue wear which is normally occasioned by the use of a traveler mechanism which comprises engaging wiper elements and which are utilized for the purpose of providing reverse air flow to dislodge dust coated on the outside of the filter bags. This is desirable because once a filter bag is worn or must otherwise be replaced the protective shield can simply be removed, another filter bag can be installed and the same protective shield can be placed over the new bag to perform the function that it previously performed with the old and worn bag. This is highly advantageous over previous structures which necessitated the use of an armor plate flange as an integral part of one of the flaps of the filter bag. The protective shield and its U-shaped cross sectional configuration may have some resiliency built into it so that it is snugly engaged in the position shown in FIG. 2 as well as being supported by means of the pins 34 extending through the openings 77.

Figure 11:
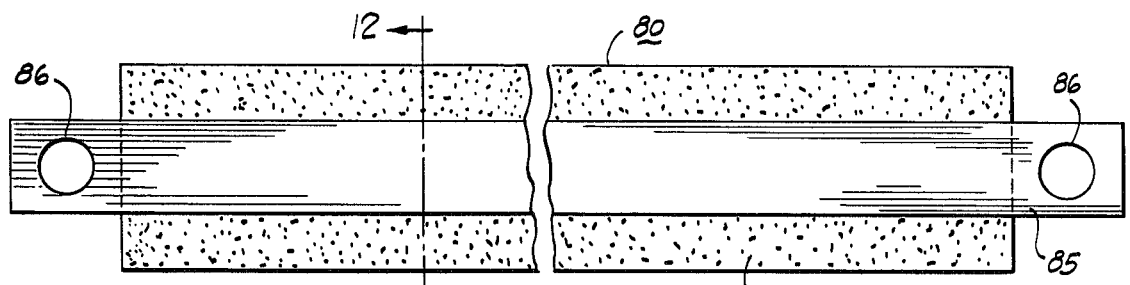
FIG. 11 is an elevational view of the air seal strip of the present invention.
Figure 12:
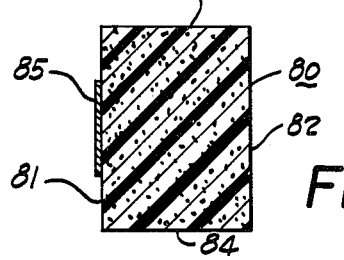
FIG. 12 is a view generally along the line 12—12 of FIG. 11.
Figure 4:
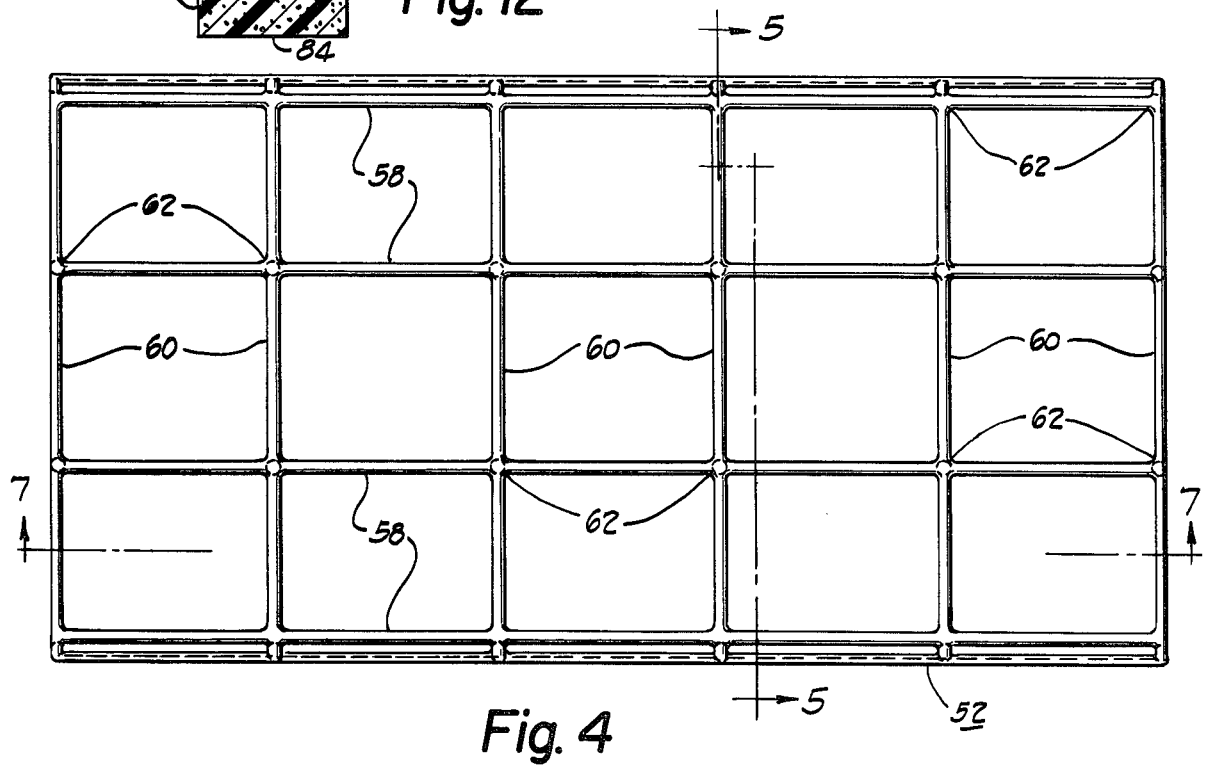
FIG. 4 is a plan view of the grid spacer of the present invention which is insertable into the filter bag of FIG. 3 to keep the bag from collapsing during use.
Figure 5:
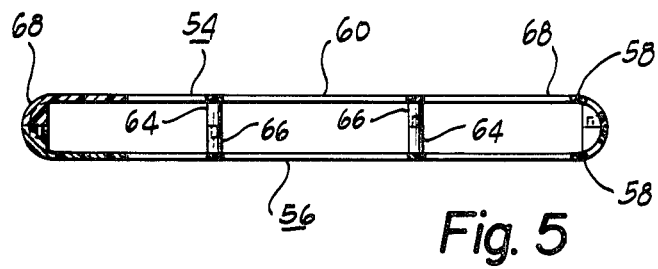
FIG. 5 is a view taken generally along the line 5—5 of FIG. 4.
Figure 7:
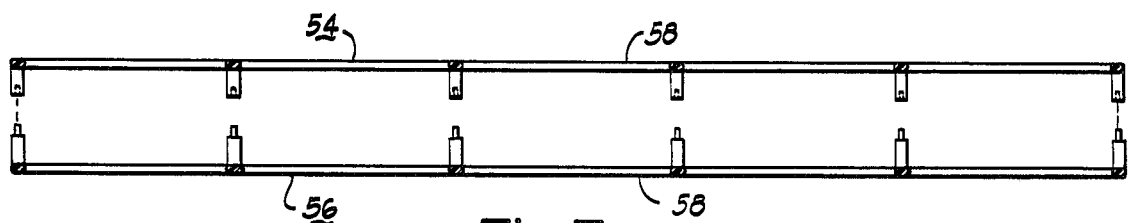
FIG. 7 is a view taken generally along the line 7—7 of FIG. 4 showing the two identical parts of the grid spacer and before the two parts are connected together.
Figure 6:
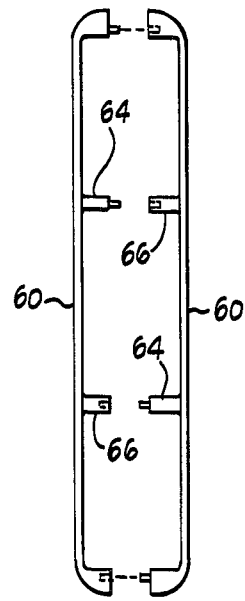
FIG. 6 is a view similar to FIG. 5 (taken in an opposite direction) but showing the two identical parts of the grid spacer prior to the parts being connected together.

FIGS. 11 and 12 illustrate the construction of the air seal strip 80 and as mentioned hereinabove, the air seal strip is for the purpose of sealing off air flow through a given filter bag opening when the bag has become damaged and no longer serves its intended function in filtering dust from the air. The air seal strip comprises an elongated member having a generally rectangular cross section defined by first, second, third and fourth walls identified by the reference numerals 81, 82, 83 and 84, respectively. The strip has a length on the order of the length of the mullions and preferably has a length on the order of the length of the opening in the bag which the air seal strip is adapted to block off. The strip, also, is constructed of a resiliently yieldable material in the nature of foam rubber so that it can conveniently conform to the opening in a filter bag and can be adjustably inserted between the space defined by adjacent mullions. A metal mounting member 85 is secured to the first wall of the strip for example by a suitable adhesive or by mechanical means if desired and the mounting member has first and second end portions for securing the strip in position. The end portions referred to have openings 86 and FIG. 2 illustrates a nut and bolt arrangement 87 which is adapted to secure both of the end portions, respectively, to the supports 30 and 31, respectively. With the air seal strip secured in position as shown in FIG. 2, air is effectively blocked from traveling through that given opening until workmen can replace the damaged bag.

It will, thus, be seen that the present invention has disclosed new and novel additions for use in dust collection apparatus. The features of the new grid spacer have been adequately discussed above and provide a grid spacer for maintaining a filter bag in its open and functioning position in such a manner as to facilitate the life of the filter bags thus resulting in a lower unit operating cost. The U-shaped protective shield provides the function of particularly protecting the flaps of the filter bags so that the wiper blades of the dust cleaning mechanisms do not do damage thereto and since it is formed as a separate part and not connected to the filter bags, it likewise reduces the unit operating cost per filter bag. Additionally, the U-shaped protective shield protects the flaps extending on both sides of the given mullion to which they are connected. The air seal strip is highly advantageous in that it reduces the down time when damage occurs to a given filter bag in the dust collection apparatus.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a dust collection apparatus, which has a dividing wall defining a high pressure side and a low pressure side which wall includes a plurality of spaced filter bags; the improvement of a spacer for positioning in the filter bags to prevent the bags from collapsing during functioning of the dust collection apparatus, said spacer comprising first and second parts, each part including a first plurality of generally parallel and longitudinally extending spaced grid members and a second plurality of generally parallel and longitudinally extending spaced grid members extending transverse to said first plurality, said first and second plurality of grid members connected together at their crossing points to form a plurality of support junctures, said first and second plurality of spaced grid members lying substantially in the same plane, opposed end portions of said second plurality of grid members being integrally formed into a curved configuration which extends out of the plane in which said first and second plurality of spaced grid members lie, first and second auxiliary grid members at the ends of said curved configuration of said second plurality of grid members and being respectively connected thereto, each of said first and second auxiliary grid members extending in the same direction as said first plurality of spaced grid members, connection posts formed at some of said support junctures, said first and second parts being connected together by said connection posts on one part being connected to said connection posts on the opposite part to form a chamber when covered by a filter bag, said connection posts being the only members within the confines of said chamber tending to obstruct the free flow of air in said chamber.

2. In a dust collection apparatus, which has a dividing wall defining a high pressure side and a low pressure side which wall includes a plurality of spaced and vertically extending channel-shaped mullions, each having vertically spaced pins which extend through openings in a flap of two adjacent filter bags each of which has two flaps which define an opening into the bag and which has a bottom supported in a position whereby the bag extends generally transverse to the dividing wall; the improvement of a spacer for positioning in the filter bags to prevent the bags from collapsing during functioning of the dust collection apparatus, said spacer comprising first and second identical parts each formed from a molded synthetic resin material, each identical part including a first plurality of generally parallel and longitudinally extending spaced grid members and a second plurality of generally parallel and longitudinally extending spaced grid members extending transverse to said first plurality, said first and second plurality of spaced grid members lying substantially in the same plane, said first and second plurality of grid members being integrally connected together at their crossing points to form a plurality of support junctures, male connection posts formed at some of said support junctures and female connection sockets formed at other of said support junctures, said first and second identical parts being connected together by said male connection posts on one part fitting into the female connection sockets on the opposite part and thereby forming a chamber particularly when covered by a filter bag, said connected male and female connection posts being the only members within the confines of said chamber tending to obstruct the free flow of air in said chamber, opposed end portions of said second plurality of grid members being formed in a curved configuration which curved configuration extends out of the plane in which said first and second plurality of spaced grid members lie, first and second auxiliary grid members at the extreme ends of said curved configuration of said second plurality of grid members and being respectively integrally connected thereto and each of said first and second auxiliary grid members extending in the same direction as said first plurality of spaced grid members.

3. In a dust collection apparatus, which has a dividing wall defining a high pressure side and a low pressure side which wall includes a plurality of spaced and vertically extending channel-shaped mullions each having vertically spaced pins extending therefrom, a filter bag having a generally elongated flat shape and comprising sidewalls, a closed bottom and first and second flaps which flaps define an opening into the bag with each flap having a reinforcing wire extending therein and, also, having spaced openings, the openings in the first flap of the filter bag fitting over the vertically spaced pins of a given mullion and the openings in the second flap of the filter bag fitting over the vertically spaced pins of a mullion adjacent the given mullion to hold the filter bag opening in open position, and means connected to the bottom of the filter bag to hold the same in extended position; the improvement of a separable protective shield to fit over and protect the first and second flaps of adjacent filter bags, which are located at a given mullion, said shield comprising an elongated member having a generally U-shaped cross section defined by first and second spaced sidewalls connected by a bottom wall, said shield having a length on the order of the length of the mullions, wall means defining spaced openings in said bottom wall, said openings in said bottom wall fitting over the vertically spaced pins of a given mullion with said bottom wall covering the extreme ends of the first and second flaps of adjacent filter bags and with said first and second sidewalls snugly engaging substantially the remainder of the first and second flaps.

4. In a dust collection apparatus, which has a dividing wall defining a high pressure side and a low pressure side which wall includes a plurality of spaced and vertically extending channel-shaped mullions each having vertically spaced pins extending therefrom, a filter bag having a generally elongated flat shape and comprising sidewalls, a closed bottom and first and second flaps which flaps define an opening into the bag with each flap having a reinforcing wire extending therein and, also, having spaced openings, the openings in the first flap of the filter bag fitting over the vertically spaced pins of a given mullion and the openings in the second flap of the filter bag fitting over the vertically spaced pins of a mullion adjacent the given mullion to hold the filter bag opening in open position, and means connected to the bottom of the filter bag to hold the same in extended position; the improvement of an air seal strip to substantially prevent the flow of air through the opening in the filter bag, said air seal strip comprising an elongated member having a generally rectangular cross section defined by first, second, third and fourth walls, said strip having a length on the order of the length of the mullions, said strip being constructed of a resiliently yieldable material, a mounting member connected to the first wall of said strip and having first and second end portions for mounting said strip, and means cooperating with said first and second end portions of said mounting member to secure said strip in the opening of a filter bag with said second and third walls being located next to adjacent mullions and said fourth wall facing the opening of the filter bag to obstruct air flow through the bag.

5. A spacer for positioning in filter bags of a dust collection apparatus to prevent the bags from collapsing comprising first and second identical parts, each identical part including a first plurality of generally parallel and longitudinally extending spaced grid members and a second plurality of generally parallel and longitudinally extending spaced grid members extending transverse to said first plurality, said first and second plurality of grid members being integrally connected together at their crossing points to form a plurality of support junctures, male connection posts formed at some of said support junctures and female connection sockets formed at other of said support junctures, said first and second identical parts being connected together by said male connection posts on one part fitting into the female connection sockets on the opposite part, opposed end portions of said second plurality of grid members being formed into a curved configuration, first and second auxiliary grid members at the extreme ends of said curved configuration of said second plurality of grid members and being respectively integrally connected thereto and each of said first and second auxiliary grid members extending in the same direction as said first plurality of spaced grid members.

6. A spacer as claimed in claim 5 wherein each identical part is comprised of on the order of 80% nylon and 20% glass fibers.

* * * * *